Jan. 21, 1964   A. H. WILLINGER   3,118,424
SPAWNING DEVICE
Filed Nov. 21, 1961

INVENTOR.
ALLAN H. WILLINGER
BY
Friedman & Goodman
ATTORNEYS

Patented Jan. 21, 1964

3,118,424
SPAWNING DEVICE
Allan H. Willinger, New Rochelle, N.Y., assignor to Aquariums Incorporated, Maywood, N.J., a corporation of Delaware
Filed Nov. 21, 1961, Ser. No. 153,826
5 Claims. (Cl. 119—3)

The present invention relates in general to an aquarium or fish tank accessory and in particular to a spawning device.

Fish are notoriously cannibalistic. Adult fish will eat their own young and will also eat eggs laid by themselves or other fish. Consequently, in order to save the baby fish and fish eggs in an aquarium or the like, it is necessary to provide some form of vegetation in which the young fish can hide and in which the eggs can be laid and thus be protected from the adult fish. However, the problem is complicated by the fact that baby fish naturally seek refuge at the top of the water level in the tank so that the spawning vegetation therefore must be provided at the top of the tank. The problem is further aggravated by the fact that the classes of fish which lay eggs may be divided into an adhesive egg layer and the non-adhesive egg layers. For the adhesive egg layers the spawning vegetation must be suspended or in a floating condition some place between the upper water level and the bottom of the tank and for the non-adhesive egg layers the spawning vegetation must be at the bottom of the tank. As a result, it is necessary to provide three different types of spawning vegetation depending upon the types of fish which are being bred. Moreover, especially in connection with amateur fish breeders, it frequently happens that the spawning vegetation is permitted to die or otherwise become damaged, so that the benefits thereof are lost with the result that the baby fish are eaten or destroyed.

In view of the foregoing, it is an object of the present invention to provide a permanent spawning device which will be as effective as natural spawning vegetation for use in an aquarium or the like and yet will avoid the disadvantages thereof when used especially by an amateur fish breeder.

It is another object of the present invention to provide a spawning device which may be used either for fish which bear live young or for fish either of the adhesive or non-adhesive egg layer type.

A further object of the present invention is to provide a spawning device which has all the advantages of natural spawning vegetation and yet which can be used permanently without the necessity of change.

Other and further objects and advantages of the present invention will be readily apparent to those skilled in the art from a consideration of the following specification taken in connection with the appended drawings.

In the drawings which illustrate the best mode presently contemplated for carrying out the invention:

Figure 1:
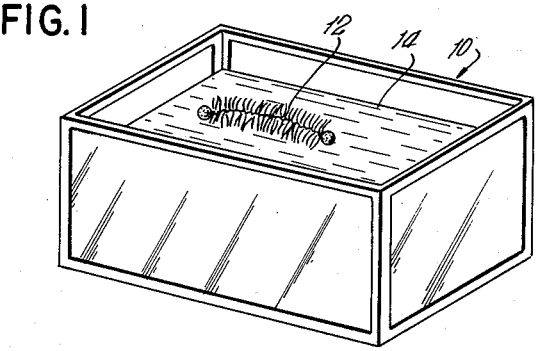
FIGURE 1 is a perspective view of an aquarium or fish tank which is provided with a spawning device pursuant to the present invention, the spawning device being arranged for use with fish which bear live young.
Figure 2:
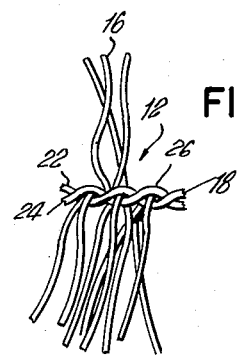
FIGURE 2 is an enlarged fragmentary view of a portion of the spawning device illustrated in FIGURE 1.
Figure 3:
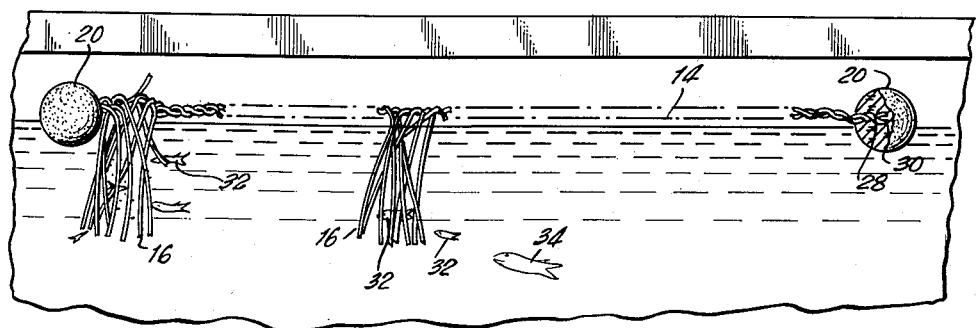
FIGURE 3 is an enlarged view of the spawning device illustrated in FIGURE 1 with a portion thereof being broken away for purposes of illustration.

Referring now to FIGURES 1, 2 and 3 of the drawings in detail, there is shown a fish tank or aquarium 10, which is provided with a spawning device 12 pursuant to the present invention. As here shown, the spawning device 12 is floating on top of the water 14 in the tank and is set up for use with fish of the live bearer type, such as, for example and not by way of limitation, guppies, platies, swordtails, and mollies, which represent a few of the popular live bearers favored by amateur fish breeders.

As here shown, the spawning device 12 comprises strands of artificial spawning grass or vegetation 16, which are secured to a holding means 18 provided with a pair of floats 20 for floating the spawning device 12 on the surface of the water 14. The strands 16 are formed preferably of a suitable artificial or synthetic fibrous material or of a suitable plastic material which when inserted in the water 14 will simulate natural spawning vegetation. As best seen in FIGURES 1 and 3, the spawning grass strands 16 will float in the water and will move or undulate in response to the currents or water movements resulting from movements of the fish and will also move when brushed against by a floating fish. The strands 16 may be formed in any suitable manner— that is, they may be formed originally as single strands or they may be shredded or otherwise severed in strand form from suitable sheet material. The strands are suitably secured or retained by the holding means 18 and as here shown, the strands are intertwined with the holding means for securement thereto. More specifically, and as shown in the present embodiment, the holding means 18 is constituted by a pair of entwined or twisted flexible wire members 22 and 24 which are formed into loops 26 through which the grass strands 16 extend and in which they are retained in position. It will be noted that the greater portion of each strand extends outwardly from both sides of the individual loops 26, so that the strands are free to move or undulate in the water so as to simulate the movements of natural spawning vegetation. The twisted wire members 22 and 24 which form the holding means 18 terminate in intertwined free end portions 28, which constitute means for receiving the floats 20 when it is desired to float the spawning device 12 on or in the water. As here shown, the floats 20 are constituted by balls of suitable buoyant material which are apertured as at 30 for receiving a twisted free end 28 of the holding means 18. It will be understood that the balls 20 are readily engageable on and removable from the free ends 28 so as to readily convert the spawning device 12 for various different uses thereof.

As shown in FIGURE 3, the spawning device 12 is arranged for use in an aquarium 10 which is provided with fish of the type which bear their young alive. For this purpose, the spawning device 12 must float on the surface of the water 14 so that the device is arranged in an elongated condition thereof in which the holding means 18 extends literally from one end to another thereof and each end 28 thereof is engaged with a float 20. In said condition of the device, the individual spawning strands 16 extend downwardly and in various directions laterally from the holding means 18 into and on top of the water 14. It will be noted that the young or baby fish 32 can readily swim among the strands 16 and thereby be protected from the adult fish 34.

Figure 4:
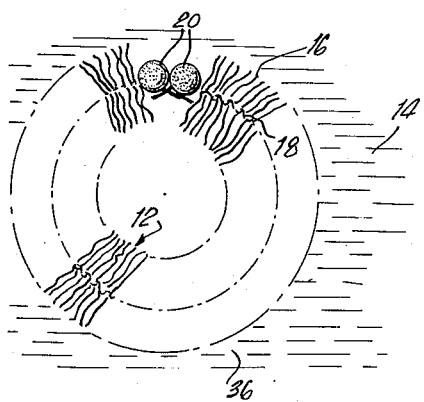
FIGURE 4 illustrates the spawning device set up or arranged for fish of the adhesive egg layer type.

FIGURE 4 illustrates the spawning device 12 in condition for use with fish of the adhesive egg layer type. Popular types of adhesive egg layers are Sumatra barbs, rosybarbs, head and tail lights, and black tetras. For use with adhesive egg layers, the spawning device 12 is formed into a circular arrangement to provide a semi-floating clump of spawning grass. This is easily accomplished by forming the holding means 18 into a circle and twisting the ends thereof together and providing the floats 20 on the twisted free ends 28. When inserted into the water 14, the spawning device 12 will be suspended below the upper level of the water 14 and extend substantially to the bottom 36 of the tank. The adhesive egg layers will lay their eggs among the grass strands 16 to which the eggs will adhere.

Figure 5:
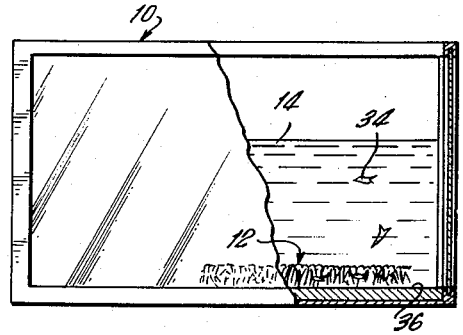
FIGURE 5 is an elevational view of a fish tank or aquarium provided with a spawning device arranged for use with fish of the non-adhesive egg layer type, a portion being broken away for purposes of illustration.

Referring now to FIGURE 5 in detail, there is shown an arrangement of the spawning device 12 for use with fish of the non-adhesive egg layer type. Popular non-adhesive egg layers are white cloud mountain fish, zebra, danios, pearl danios, and spotted danios. While in the case of the live bearers, the spawning device 12 must float on top of the water 14 since baby fish will naturally seek refuge at the top of the water in the tank, in the case of the non-adhesive egg layers, the spawning device must sing to the bottom of the tank since these types of fish lay their eggs at the bottom of the tank. Consequently, in arranging the spawning device 12 for non-adhesive egg layers, the holding means 18 constituted by the intertwined wire strands 16 is permitted to remain in the elongated or linear condition thereof as in connection with live bearers. However, the floats 20 are removed from the float holding means 28 constituted by the free ends of the wires so that the spawning device 12 is permitted to sink to the bottom of the tank as clearly shown in FIGURE 5. In this position, the non-adhesive egg layers swim over the device 12 and permit their eggs to fall among the strands 16 to which the eggs become inaccessible and/or hidden from the adult fish.

In view of the foregoing, it will be readily apparent that there is provided a permanent type of spawning device pursuant to the present invention, which may be used either for fish of the live bearer type, the adhesive egg layer type, or non-adhesive egg layer type, the device 12 being readily adaptable for each type of use to provide a natural appearing and naturally effective spawning means. It is preferred to form the strands of a material capable of withstanding sterilization temperatures so that the device may be sterilized as desired.

While I have illustrated and described the presently preferred embodiment of my invention, it will be apparent that changes and modifications may be made therein without however departing from the spirit and scope of the invention as set forth in the appended claims.

I claim:

1. A fish spawning device comprising a pair of entwined members defining a plurality of loops between the ends thereof, stranded material secured in said loops and extending therefrom, and free ends on said entwined members adapted to receive floats, said material simulating natural spawning vegetation.

2. A fish spawning device as in claim 1, said members being flexible wires.

3. A spawning device as in claim 1, said stranded material simulating natural spawning grass.

4. A spawning device comprising a pair of entwined elongated flexible members defining a plurality of loops between the opposite free ends thereof, stranded material engaged between the ends of each strand in said loops so as to extend therefrom, and means constituted by said opposite free ends for affixing floats to said device, said stranded material simulating natural spawning grass.

5. A spawning device comprising a pair of entwined elongated flexible wires defining a plurality of loops between the opposite free ends thereof, stranded material engaged between the ends of each strand in said loops so as to extend therefrom, and floats removably affixed to the free ends of said entwined wires, said stranded material simulating natural spawning grass.

References Cited in the file of this patent

UNITED STATES PATENTS

| | | |
|---|---|---|
| 255,501 | Graham | Mar. 28, 1882 |
| 1,523,895 | Pott | Jan. 20, 1925 |
| 2,523,949 | Gambill | Sept. 26, 1950 |
| 2,553,980 | Ostrander | May 22, 1951 |
| 2,765,773 | Gruel | Oct. 9, 1956 |
| 2,841,113 | Ebert | July 1, 1958 |
| 3,079,723 | Roes | Mar. 5, 1963 |